(12) United States Patent
Bajko

(10) Patent No.: US 10,506,443 B2
(45) Date of Patent: Dec. 10, 2019

(54) WHITE SPACE DATABASE DISCOVERY

(71) Applicant: Nokia Technologies Oy, Espoo (FI)

(72) Inventor: Gabor Bajko, Santa Clara, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/787,136

(22) PCT Filed: Apr. 29, 2013

(86) PCT No.: PCT/US2013/038692
§ 371 (c)(1),
(2) Date: Oct. 26, 2015

(87) PCT Pub. No.: WO2014/178822
PCT Pub. Date: Nov. 6, 2014

(65) Prior Publication Data
US 2016/0073269 A1 Mar. 10, 2016

(51) Int. Cl.
*H04W 16/14* (2009.01)
*H04W 4/50* (2018.01)
*H04W 4/029* (2018.01)
*H04W 48/16* (2009.01)
*H04W 72/04* (2009.01)

(52) U.S. Cl.
CPC .......... *H04W 16/14* (2013.01); *H04W 4/029* (2018.02); *H04W 4/50* (2018.02); *H04W 48/16* (2013.01); *H04W 72/0453* (2013.01)

(58) Field of Classification Search
None
See application file for complete search history.

(56) References Cited

U.S. PATENT DOCUMENTS

| | | | | |
|---|---|---|---|---|
| 6,748,385 B1 * | 6/2004 | Rodkin | ............... | G06F 16/748 |
| 7,966,219 B1 * | 6/2011 | Singh | ................. | G06Q 30/02 |
| | | | | 705/26.7 |
| 8,028,089 B2 * | 9/2011 | Christianson | ....... | H04L 67/2814 |
| | | | | 709/238 |
| 8,200,842 B1 * | 6/2012 | Lau | .................... | H04L 43/0817 |
| | | | | 709/245 |
| 8,463,915 B1 * | 6/2013 | Kim | .................... | H04L 67/1036 |
| | | | | 709/227 |

(Continued)

FOREIGN PATENT DOCUMENTS

| EP | 2992691 A1 | 3/2016 |
|---|---|---|
| JP | 2002091819 A | 3/2002 |

(Continued)

OTHER PUBLICATIONS

Mancuso et al: "Protocol to Access White Space (PAWS) Database: Use Cases and Requirements." IETF. Mar. 13, 2013.*

(Continued)

*Primary Examiner* — Andrew C Oh
(74) *Attorney, Agent, or Firm* — Mintz Levin Cohn Ferris Glovsky and Popeo, P.C.

(57) ABSTRACT

Methods and apparatus, including computer program products, are provided for white space database discovery. In one aspect there is provided a method. The method may include sending, by a user equipment, a request to a server including a white space database, wherein the server is located at a first address; and receiving, at the user equipment, a response to the request, the response including at least one of an identity of the server or a second address for accessing at least one of the server or another server including another white space database. Related apparatus, systems, methods, and articles are also described.

16 Claims, 6 Drawing Sheets

(56) References Cited

U.S. PATENT DOCUMENTS

| | | | |
|---|---|---|---|
| 8,521,094 B2 | 8/2013 | Hamdi et al. | |
| 9,161,357 B2* | 10/2015 | Horn | H04W 12/06 |
| 2002/0047861 A1* | 4/2002 | LaBrie | G06Q 30/02 |
| | | | 715/733 |
| 2005/0080848 A1* | 4/2005 | Shah | G06Q 10/107 |
| | | | 709/204 |
| 2007/0233853 A1* | 10/2007 | Sarma | H04L 41/22 |
| | | | 709/224 |
| 2008/0222019 A1 | 9/2008 | Stanforth et al. | |
| 2009/0285130 A1* | 11/2009 | Knaz | H04M 3/56 |
| | | | 370/260 |
| 2010/0041339 A1 | 2/2010 | Miller, II | |
| 2010/0088393 A1* | 4/2010 | Udd | H04L 29/12462 |
| | | | 709/217 |
| 2010/0281108 A1* | 11/2010 | Cohen | H04N 21/235 |
| | | | 709/203 |
| 2011/0126287 A1* | 5/2011 | Yoo | H04L 63/145 |
| | | | 726/24 |
| 2011/0287802 A1 | 11/2011 | Ma et al. | |
| 2012/0030274 A1* | 2/2012 | Christenson | G06F 16/162 |
| | | | 709/203 |
| 2012/0052891 A1* | 3/2012 | Irnich | H04W 52/243 |
| | | | 455/501 |
| 2012/0131143 A1 | 5/2012 | Nakazawa | |
| 2012/0281593 A1* | 11/2012 | Stewart | H04W 16/14 |
| | | | 370/259 |
| 2012/0281594 A1* | 11/2012 | Stewart | H04W 16/14 |
| | | | 370/259 |
| 2013/0103684 A1 | 4/2013 | Yee et al. | |
| 2013/0173651 A1* | 7/2013 | Probasco | H04W 16/14 |
| | | | 707/769 |
| 2013/0331117 A1* | 12/2013 | Probasco | H04W 48/04 |
| | | | 455/456.1 |
| 2014/0038655 A1* | 2/2014 | Garnett | H04W 16/14 |
| | | | 455/509 |
| 2014/0301242 A1* | 10/2014 | Hassan | H04W 16/14 |
| | | | 370/254 |
| 2016/0073269 A1 | 3/2016 | Bajko | |

FOREIGN PATENT DOCUMENTS

| | | |
|---|---|---|
| JP | 2002230434 A | 8/2002 |
| JP | 2012-175603 A | 9/2012 |
| WO | WO-2014178822 A1 | 11/2014 |

OTHER PUBLICATIONS

International Search Report and Written Opinion received for corresponding Patent Cooperation Treaty Application No. PCT/US2013/038692, dated May 3, 2014, 11 pages.

Mancuso, et al., "Protocol to Access White Space (PAWS) Database: Use Cases and Requirements; draft-ietf-paws-problem-stmt-usecases-rqmt 2-14.txt", Internet Engineering Task force, IETF, Standard Working Draft, Internet Society (ISOC) 4, Rue Des Falasies Ch-1205 Geneva, Switzerland, Mar. 4, 2013, pp. 1-23.

Chen, et al., "Protocol to Access Spectrum Database; draft-ietf-paws-protocol-03.txt", Internet Engineering Task force, IETF, Standard Working Draft, Internet Society (ISOC) 4, Rue Des Falasies Ch-1205 Geneva, Switzerland, Feb. 13, 2013, pp. 1-79.

"3rd Generation Partnership Project; Technical Specification Group Radio Access Network; Evolved Universal Terrestrial Radio Access (E-UTRA); LTE physical layer; General description (Release 12)", 3GPP TS 36.201, V12.2.0, Mar. 2015, pp. 1-14.

"3rd Generation Partnership Project; Technical Specification Group Radio Access Network; Evolved Universal Terrestrial Radio Access (E-UTRA); Physical channels and modulation (Release 12)", 3GPP TS 36.211, V12.7.0, Sep. 2015, pp. 1-136.

"3rd Generation Partnership Project; Technical Specification Group Radio Access Network; Evolved Universal Terrestrial Radio Access (E-UTRA); Multiplexing and channel coding (Release 12)", 3GPP TS 36.212, V12.6.0, Sep. 2015, pp. 1-95.

"3rd Generation Partnership Project; Technical Specification Group Radio Access Network; Evolved Universal Terrestrial Radio Access (E-UTRA); Physical layer procedures (Release 12)", 3GPP TS 36.213, V12.7.0, Sep. 2015, pp. 1-241.

"3rd Generation Partnership Project; Technical Specification Group Radio Access Network; Evolved Universal Terrestrial Radio Access (E-UTRA); Physical layer; Measurements (Release 12)", 3GPP TS 36.214, V12.2.0, Mar. 2015, pp. 1-17.

Office action received for corresponding Korean Patent Application No. 2015-7033978, dated Mar. 29, 2016, 5 pages.

Mancuso et al., "Protocol to Access White-Space (PAWS) Databases: Use Cases and Requirements", Internet Engineering Task Force (IETF), RFC : 6953, May 2013, pp. 1-23.

Office action received for corresponding Singapore Patent Application No. 11201508885W, dated Jul. 11, 2016, 6 pages.

"Protocol to Access White-Space (PAWS) Databases: Use Cases and Requirements", draft-ietf-paws-problem-stmt-usecases-rqmts-15, Internet Draft, Mar. 13, 2013, 27 pages.

Office action received for corresponding Japanese Patent Application No. 2016-510659, dated Nov. 17, 2016, 5 pages of office action and 4 pages of office action translation available.

Wei, X., et al., "PAWS Database Discovery; draft-wei-paws-database-discovery-00," Internet Engineering Task Force, Internet-Draft, Feb. 18, 2013.

Lei, Zhu, "Protocol to Access White Space database: PAWS framework data model draft-lei-paws-framework-datamodel-00.txt," IETF Trust, Internet-Draft, Mar. 5, 2012, pp. 4-12.

* cited by examiner

300

Send a request to a WSDB, wherein the WSDB is identified from a preconfigured list of WSDBs stored at the UE 310

Receive a response including at least one of an updated address where the WSDB can be reached, an address of another WSDB, and a time associated with when the WSDB and the other WSDB can be accessed 320

```
┌─────────────────────────────────────┐
│  Send a request to a regulatory server to │
│  obtain an updated list of WSDBs 410      │
└─────────────────────────────────────┘
                    │
┌─────────────────────────────────────┐
│  Receive, in response to the request, a   │
│  response including the updated list of WSDBs │
│                 420                   │
└─────────────────────────────────────┘
```

FIG. 4

WHITE SPACE DATABASE DISCOVERY

RELATED APPLICATION

This application was originally filed as Patent Cooperation Treaty Application No. PCT/US 2013/038692 filed Apr. 29, 2013.

FIELD

The subject matter described herein relates to wireless communications

BACKGROUND

Some jurisdictions are creating regulations allowing a radio, such as a cognitive radio (CR), to operate in certain frequency bands on a licensed-exempt basis (e.g., without requiring a license to broadcast on the frequency bands). For example, the Federal Communications Commission (FCC) has allocated the ultrahigh frequency (UHF) band (commonly used for UHF TV) for licensed-exempt use, and the vacant channels in this band are referred to as white space or TV white space (TVWS). Other jurisdictions around the world, such as Office of Communications (OFCOM) in the United Kingdom, are also making white space available. To that end, the Internet Engineering Task Force (IETF) is developing standards for protocols for accessing databases (see, for example, Protocol to Access White Space Database, draft-ietf-paws-protocol-03, February 2013, and other related and subsequent standards, hereinafter PAWS). Moreover, these databases may be certified by regulators, such as the FCC and the like, to operate in a given regulatory region or domain.

To use the TV white space, regulators typically mandate a lookup into a database containing available frequencies (e.g., also referred to as available channels and/or an available channel list) at a given location before a device can transmit in the given location. This lookup is typically required by regulators to prevent usage on the TV white space to interfere with licensed spectrum usage, such as licensed TV UHF broadcasts. Moreover, a master device is typically used to access the database and obtain the available frequencies and respective maximum permitted transmit powers for those frequencies. The master device knows its location and is authorized to receive from the database available frequencies based on location. The master device may then provide the available frequencies to associated white space devices (also referred to as slaves), so that the white space devices can transmit on the available frequencies.

The white space device may comprise a radio that is a so-called "slave" device because it may not know its location (even though it may have a location determination capability, this capability may not function or may be inoperative) or the slave does not have the necessary functionality to communicate to an authorized database configured to provide available frequencies. Instead, the slave relies on the master device to obtain available frequency/channel information obtained from the database. For example, the white space device (or slave) may check for available frequencies by requesting the available frequencies from the master device serving the slave. Next, the master provides to the database a request for available frequencies and location information (representative of the location of the master device). The database returns to the master the available white space frequencies and optionally maximum transmit powers for the given location. Next, the master delivers the available frequencies and/or maximum transmit powers to the slave. The slave device may then operate on any of the available frequencies provided by the master, so long as the slave remains within range of the master. In the case of the FCC, the slave may use the available frequencies provided by the master, so long as the slave receives a contact verification signal (CVS) transmitted by the master device.

SUMMARY

Methods and apparatus, including computer program products, are provided for white space database discovery. In one aspect there is provided a method. The method may include sending, by a user equipment, a request to a server including a white space database, wherein the server is located at a first address; and receiving, at the user equipment, a response to the request, the response including at least one of an identity of the server or a second address for accessing at least one of the server or another server including another white space database.

In some variations of some of the embodiments disclosed herein, one or more of the features disclosed herein including following may be included. The response may further include a time representative of when the second address is accessible to obtain an allocation of a white space frequency. The time may represent a start time when the other server is accessible to allocate the white space frequency. The time may represent a start time when the server is not able to allocate the white space frequency due to at least one of a permanent or a temporary closure of the server. The response may further include an indication of whether the first address is to be replaced with the second address. The request may include an indication requesting a list of certified white space databases. The request may include an indication to the server to provide at least one address for at least one white space database. The request may include an indication for the server to respond with one or more addresses corresponding to one or more white space databases associated with a regulatory domain. The response may include a plurality of addresses for a plurality of white space databases. The response may include at least one of registration information associated with the second address in the response or authorization information associated with the second address in the response. The registration information may represent whether the other server requires registration, and wherein the authorization information includes at least one of a first information representative of whether the other server requires authentication or a second information representative of a type of credential required by the other server. The server may include at least one of a provisioning server or a regulatory server, wherein the provisioning server may be maintained by a manufacturer of the user equipment to provide the response including addresses of white space databases available and authorized to allocate white space frequencies to the user equipment, and wherein the regulatory server may be maintained by a regulator of white space frequencies in a regulatory domain covered by the user equipment.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings,

FIGS. 2-4 depict examples of processes for handling updates to information pre-configured at user equipment to enable the user equipment to discover white space frequencies, in accordance with some example embodiments;

Figure 1:
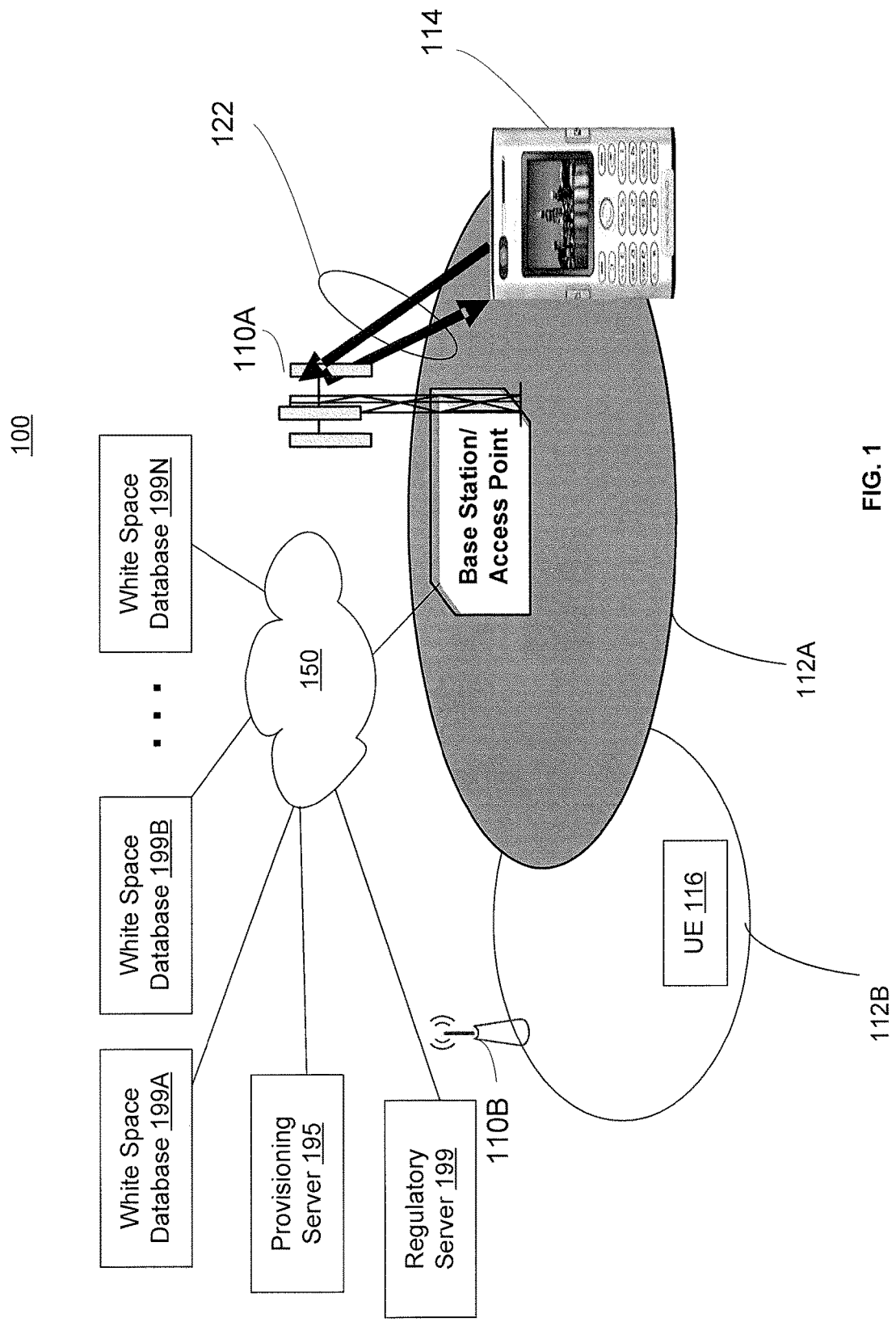
FIG. 1 depicts a block diagram of a wireless communication system, in accordance with some example embodiments.

Like labels are used to refer to same or similar items in the drawings.

DETAILED DESCRIPTION

Following the move from analog broadcast television to digital, unused television channels known as "white space" or "TV white space" have become available for unlicensed use. As a result, opportunities are being created in the U.S. and worldwide for devices, such as user equipment and the like, to operate in this allocated portion of the electromagnetic spectrum. As noted above however, use of available white space spectrum is, and will be, closely regulated to avoid interference among incumbent services and devices utilizing the white space. For example, devices in the U.S. are required to query a television (TV) bands white space database (herein after referred to as TV white space database and/or TV WSDB) certified by the Federal Communications Commission (FCC) to ensure proper channel allocation of the white space; other jurisdictions have or are contemplating similar schemes. Accordingly, a user equipment may be required to choose and access at least one provider of a certified TV WSDB in order to operate in the authorized TV white space spectrum. Furthermore, although the quantity of these certified TV WSDBs is likely to be limited, the list of TV WSDBs will likely not be static as new databases may be added over time and certified databases may shut down permanently or temporarily.

In some example embodiments, the subject matter disclosed herein may relate to discovering certified TV WSDBs. Moreover, the subject matter disclosed herein may relate to, in some example embodiments, updates to the pre-provisioned list of TV WSDBs at a device, such as a user equipment.

In some example embodiments, a user equipment may, at the time of manufacturing, be pre-configured or provisioned with a list including the addresses, such as internet protocol addresses, uniform resource identifier (URI), uniform resource locator (URL), and the like, of certified TV white space databases. The subject matter disclosed herein may, in some example embodiments, also relate to updates, such as changes, revisions, and additional information, provided to the pre-provisioned list of TV WSDBs at the user equipment.

In addition to a cellular interface, a WiFi interface, and/or a Bluetooth radio interface, the user equipment, such as a smart phone or other device, may be configured to include a radio, such as a cognitive radio, configured to operate in white space frequency bands, such as the TV white space band(s).

In some example embodiments, the user equipment may be configured as a slave device configured to access a master at a wireless access point, such as a cellular base station, which then accesses the TV WSDB, although a user equipment may also be configured to serve as a master as well. In any case, the TV WSDB may provide one or more white space frequencies (also referred to as channels) available for use in the white space at a certain location, such as the location of the user equipment. The TV WSDB may also provide other information related to use of the white space, such as maximum transmit power values to be used at the allocated white space frequencies and other white space-related information as described further below. The user equipment may then utilize the TV white space frequency for transmission and/or reception over the white space frequencies/channels (for example, to enable broadband access, peer-to-peer communications, ad hoc communications, hot spots, and/or the like).

Before providing additional details, an exemplary system environment 100 is described in connection with FIG. 1. In some example embodiments, the wireless communication system 100 may include one or more wireless access points, such as base stations 110A-B, supporting corresponding service or coverage areas, such as coverage areas 112A-B (also referred to as cells). The base stations 110A-B may be capable of communicating with wireless devices, such as user equipment 114 and 116, within the coverage areas.

In some example embodiments, a user equipment, such as user equipment 114 and 116, may access a list identifying one or more TV WSDBs 199A-N. The list may identify the addresses of one or more of the TV WSDBs 199A-N, and these addresses may be pre-provisioned at the time of manufacture of the user equipment (or at other times as well) to allow access by the user equipment when discovery of a TV WSDB is performed. These TV WSDBs 199A-N may be certified by a regulatory body to provide TV white space frequencies to a user of TV white space. Moreover, these TV WSDBs 199A-N may provide a TV white space frequency to a user equipment based on location, so the user equipment receives a TV white space frequency available for use at a given location, such as cell 112 and the like.

To illustrate further, user equipment 114 may access a pre-provisioned list of TV WSDB addresses, such as the addresses for TV WSDBs 199A-N. This pre-provisioned list may, in some example embodiments, be updated (for example, revised, modified, augmented, supplemented, and the like) to include updated addresses and/or other white space-related information. Further, this updated information may, in some example embodiments, be provided to user equipment 114 by a provisioning server 195 via wireless access link(s) 122 and base station 110A (which includes backhaul links/network 150 to the TV WSDBs 199A-N).

When base station 110A serves as a master, a TV WSDB may provide to base station 110A white space frequencies and/or other white space-related information (for example, a maximum transmit power and the like), so that base station 110A can then provide this information to a slave, such as user equipment 114. The user equipment 114 may then begin transmission (for example, at a power less than or equal to the maximum transmit power provided by TV WSDB) on at least one of the provided frequencies in the TV white space. In some exemplary embodiments, the white space frequencies correspond to TV white space frequencies, although other white space frequencies may be used as well. When base station 110A is configured to transmit a CVS signal, user equipment 114 may transmit on the TV white space frequency provided by the TV WSDB, so long as the user equipment can detect the CVS signal.

In some example embodiments, TV WSDBs 199A-N may include frequencies available for use without a license, and these license-exempt frequencies may be referred to as white space and/or white space frequencies. In some example embodiments, the white space includes TV white space, which refers to white space typically associated with the TV licensed portion of the spectrum (e.g., UHF and the like). Because the available frequencies in the white space may be provided in order to avoid interference with licensed usage of the spectrum, user equipment and/or base stations serving a user equipment may need to register with a TV WSDB database before a TV white space frequency is allocated for use. This information provided by the user equipment/base station to obtain an available white space frequency list may include one or more of the following: location information representative of the location of the user equipment; location information representative of the location of the base station; coverage area of the base station; transmitted power of the base station; contour (or topography) in the region where the base station is located; a timing advance value (representing a transmission time (and thus distance) between the user equipment and base station); base station antenna parameters; and any other information which may be relevant to determine whether user equipment in the coverage area of the base station may cause interference to licensed users of the spectrum.

In some example embodiments, system 100 may include a regulatory server 199. Regulatory server 199 may be implemented by a given spectrum regulator and may provide a listing of TV WSDBs certified to dispense white space frequencies within a domain/region regulated by the regulator, such as the FCC, OFCOM, and the like. For example, a user equipment may access a server, such as a regulatory server 199, to obtain via, for example, the Internet or other network, a current list of the identities including addresses of TV WSDBs certified and currently accessible for purposes of obtaining white space frequencies in a region corresponding to the regulatory server 199 (for example, a regulatory server 199 sponsored by the FCC would provide white space frequencies for devices operating in the US, but not Europe).

Base stations 110A-B may, in some example embodiments, be implemented as an evolved Node B (eNB) type base station consistent with standards, including the Long Term Evolution (LTE) standards, such as 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer-Measurements, and any subsequent additions or revisions to these and other 3GPP series of standards (collectively referred to as LTE standards). The base station may also be configured as a femtocell base station, home evolved node B base station, a picocell base station, a WiFi access point, and/or a wireless access point configured in accordance with other radio access technologies as well.

The user equipment, such as user equipment 114 and/or 116, may be implemented as a mobile device and/or a stationary device. The user equipment are often referred to as, for example, mobile stations, mobile units, subscriber stations, wireless terminals, tablets, smart phones, or the like. A user equipment may be implemented as, for example, a wireless handheld device, a wireless plug-in accessory, a wireless transceiver configured in a stationary device, a wireless transceiver configured in a mobile device and/or the like. In some cases, user equipment may include a processor, a computer-readable storage medium (e.g., memory, storage, and the like), a radio interface(s), and/or a user interface. In some example embodiments, the user equipment may comprise a multi-mode radio include a plurality of radio access including, for example, one or more of the following: a cellular radio interface (e.g., LTE, LTE-Advanced, and the like), a WiFi radio interface, a Bluetooth radio interface, and a cognitive radio configured to allow operation on a white space frequency, such as the TV white space. In some example embodiments, the white space is the TV UHF band, although other white space frequencies may be used as well.

Although FIG. 1 depicts two base stations 110A-B, two cells 112A-B, and two user equipment 114 and 116, three TV WSDBs 199 A-N, a single provisioning server including database 195, and a single regulatory server 199, the wireless communication system 100 may include other quantities and configurations of these devices as well.

In some example embodiments, user equipment 114 and/or 116 may be pre-provisioned/configured with a list of one or more certified databases, such as the addresses of TV WSDBs 199A-N, and this pre-provisioning may occur during manufacturing (although this pre-provisioning may occur at other times as well). When pre-provisioned, the user equipment may select at least one of the TV WSDBs, such as TV WSDB 199A, from the pre-provisioned list and then send a request to query the selected TV WSDB 199A for white space spectrum information, such as TV white space frequencies/channels. If there is no response from the selected TV WSDB or there is an error response received from the queried TV WSDB, the user equipment may then select (which may be in accordance to a selection scheme) another TV WSDB database, such as TV WSDB 199B and the like, from the user equipment's list of pre-provisioned TV WSDBs and then again query the selected TV WSDB for TV white space frequencies/channels. Indeed, the user equipment may repeat the process until the user equipment successfully obtains a response, such as a TV white space frequency allocation from a TV WSDB, or the user equipment does not successfully receive a response from any of the TV WSDBs in the pre-provisioned list.

Figure 2:
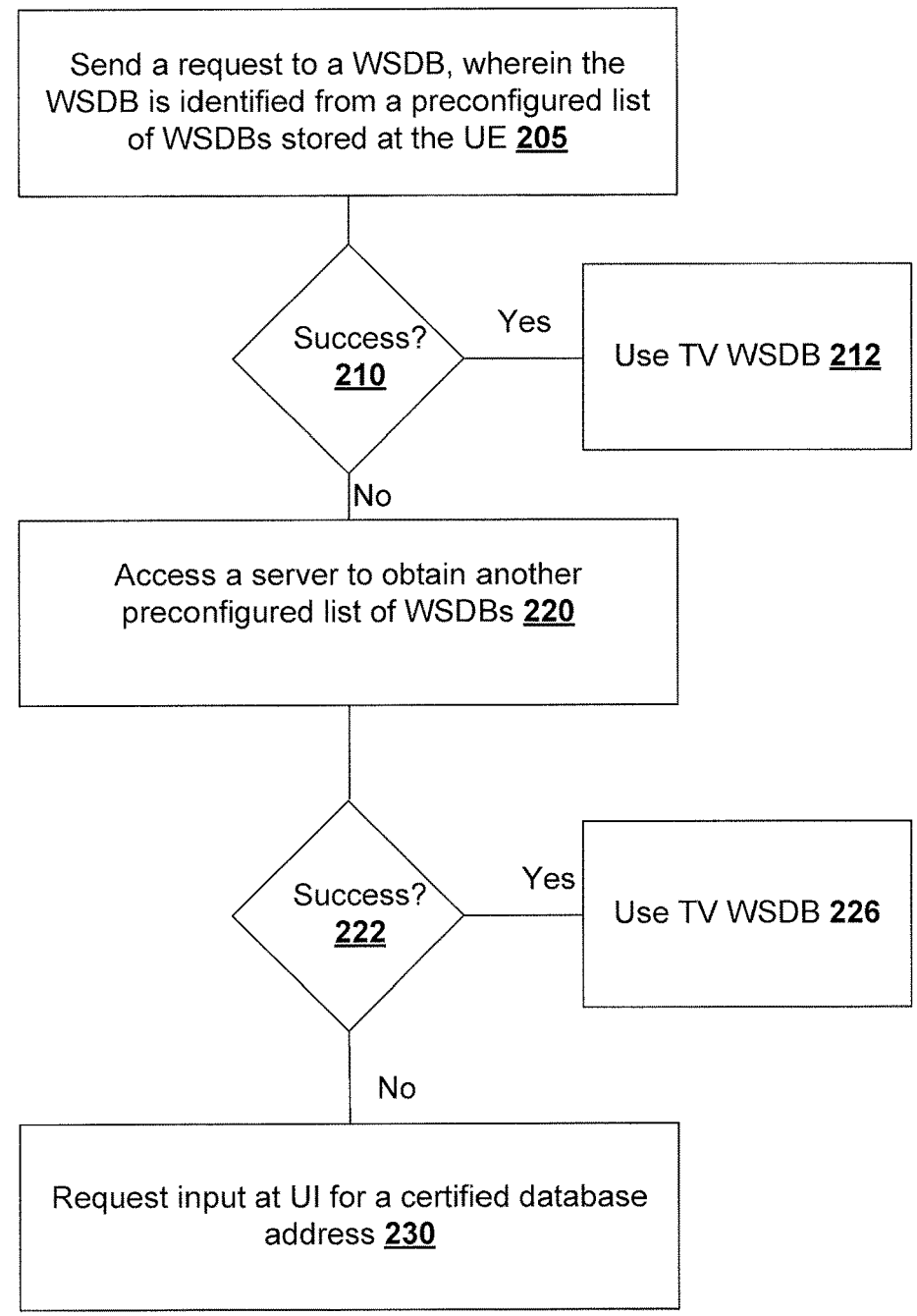

FIG. 2 addresses a process 200 that may be implemented when user equipment 114 queries TV WSDBs pre-provisioned/configured on a list containing TV WSDBs. The description of FIG. 2 also refers to FIG. 1.

User equipment 114 may be pre-configured with a list of the identities and/or addresses where one or more TV WSDBs 199A-N may be accessed. This pre-configured list may be provided as information, such as firmware, installed during the manufacture, setup, and the like of user equipment 114 (although the pre-configured list may be provided at other times as well).

User equipment 114 may send, at 205, a request to each of the TV WSDBs 199A-N identified on the pre-configured list of TV WSDBs. If user equipment 114 successfully receives a response, such as an acknowledgment, an indication of a registration with a TV WSDB, and/or a response containing a TV white space frequency allocation, user equipment 114 may then use (yes at 210 and 212) the TV WSDB that responded as well as the corresponding TV white space frequencies provided by that TV WSDB.

However, if user equipment 114 does not successfully receive (no at 210) a response from any of the TV WSDBs 199A-N on the pre-configured list, user equipment 114 may access, at 220, a server, such as provisioning server 199 and the like, to obtain updated TV WSDB information. For example, provisioning server 199 may be implemented by an entity, such as the manufacturer of the user equipment 114, to provide updated information, such as new (for example, another, revised, and the like) firmware including the pre-provisioned list of certified TV WSDBs at user equipment 114. This update may be in the form of updated addresses for TV WSDBs currently in use or active as well as other white space-related information regarding the TV WSDBs and use of those databases and/or allocated frequencies. For example, provisioning server 195 may provide a complete list of currently active TV WSDBs or supplement the existing list with changes or additions to the list configured during manufacture.

User equipment 114 may then use the updated list of TV WSDBs provided at 220 to access TV WSDBs on the updated list, and if the user equipment 114 is able to successfully access one of those TV WSDB, the user equipment 114 will use that TV WSDB (yes at 222 and 226) to obtain a TV white space frequency allocation. However, if user equipment 114 again fails to successfully receive (no at 222) a response from any of the TV WSDBs on the updated list, user equipment 114 may then request, at 230, an input for an address where a TV WSDB may be found. For example, user equipment 114 may present a user interface where an address of a TV WSDB can be reached.

Although the previous example describes provisioning server 195 as associated with the manufacturer, other entities may provide or grant access to the provisioning server as well.

FIG. 3 addresses a process 300 that may be implemented when user equipment 114 queries a list of TV WSDBs pre-provisioned/configured at the user equipment 114. Specifically, process 300 relates to handling a change of address and/or either temporary or permanent shutdowns of a TV WSDB. The description of FIG. 3 also refers to FIG. 1.

In some example embodiments, user equipment 114 may send, at 310, a request to a TV WSDB 199N to obtain a frequency allocation. This request may be sent to a TV WSDB 199N identified in a pre-configured list stored at user equipment 114. In some example embodiments, the request sent at 310 may include an indication, such as a parameter, and this parameter may signal the TV WSDB 199N to respond to the user equipment 114 with addresses of other TV WSDBs in a certain regulatory domain/region (for example, the same region as the signaled TV WSDB 199N or another, specified regulatory domain). The request message sent at 310 may also include a request for additional white space related information, such as authorization and/or security related information (for example, is registration with the TV WSDBs required; or an indication of whether the other TV WSDBs require authentication and, if so, what credentials should be used to authenticate and the like). The queried TV WSDB 199N may respond as described with respect to 320 below but in some instances, the queried TV WSDB 199N may not respond to the request (for example, the database may not support the request or choose not to respond).

To illustrate by way of another example, a user equipment may send a request to WSDB, but the request may not include the above-noted parameter. When this is the case, the TV WSDB may instead respond with the WSDB's updated address, which may further include a start time when the updated address can be used, so the user equipment knows when and where to contact the WSDB.

At 320, user equipment 114 may receive a response from the TV WSDB 199N, and this response may include information, such as the requested information, update information, and/or the like. For example, the update information may comprise a parameter indicative of another (or a new) address of the TV WSDB if the existing address is going to be changed, and this information may include a time when the new address takes effect (and thus can be used by the user equipment to access the TV WSDB). The update information/parameter may also represent an address of another database, when the responding TV WSDB is shutting down permanently or temporarily. The update information/parameter may also include a plurality of addresses for one or more other TV WSDBs, the update may also include a start time specifying when the addresses can be used, a stop time specifying when the new address cannot be used, a duration specifying how long the new addresses can be used, and/or any other white space-related information. The update information/parameter may also provide instructions to the user equipment. For example, the information/parameter may specify whether the updated addresses are in addition to, or a replacement for, the database addresses currently being used in the TV WSDB list at the user equipment. As noted, the response may include additional white space related information including authorization and/or security related information (for example, registration information for a white space database required, authorization information for a WSDB including the type of credentials that should be used to authenticate and the like. Table 6 described further below depicts an example of a response (which may be sent at 320) including an indication of whether registration is required or the types of credentials required for authentication.

FIG. 4 relates to a process 400 for handling updates to a pre-configured list of TV WSDBs, in accordance with some example embodiments. The description of process 400 also refers to FIG. 1.

The pre-configured list may be updated from time to time as new TV WSDBs are certified. For example, user equipment 114 may be preconfigured with an address of a server associated with a regulator of the TV white space frequencies. For example, this regulatory server 199 may be maintained by a spectrum regulator (or an entity authorized by the regulator), and may provide information, such as a listing of all certified TV WSDBs, in a given domain, such as a region regulated by the regulator. When this is the case, user equipment 114 may from time to time send a request to a server, such as regulatory server 199 or a listing server maintained by the regulator, to obtain an updated TV WSDB listing information, such as the addresses of TV WSDBs certified by the regulator associated with regulatory server 199. In response, the regulatory server 199 may provide the requested information to user equipment 114.

In some example embodiments, the request sent 410 may be implemented as a command. For example, the command may be implemented as a GETDATABASEADDR command, and this command may be specified by a standard, such as an IETF PAWS related standard, or may be proprietary as well. This GETDATABASEADDR command may initiate a download to the user equipment sending the command of some, if not all, of the currently certified database addresses at regulatory server 199. If server 199 does not support such a dedicated GETDATABASEADDR command, regulatory server 199 may return an error, in which case the user equipment may perform a traditional hyper text transfer protocol Get command to a listing server to download its contents and then extract TV WSDB addresses/URIs from it.

Tables 1-8 below depict example formats that may be used in some example embodiments.

In some example embodiments, the response from a TV WSDB may be sent to a master, which may also be referred to as a white space master, and this information may be configured as shown in Table 1 below.

TABLE 1

| INIT_RESP/AVAIL_SPECTRUM_RESP | |
|---|---|
| rulesetInfo:RulesetInfo | required |
| new_db_address | optional |
| additional_db_addresses | Optional |
| *other:any | depends |

In the example of Table 1, the db_address parameter lists a new address to be used in future communication of the TV WSDB with which the master currently accesses. The TV WSDB may insert this parameter whenever it knows that its address is going to change in the future. The additional_db_addresses may list additional databases that the master can access when in that given jurisdiction. The TV WSDB may insert this parameter whenever it knows that a new TV WSDB for the same jurisdiction was approved by a regulator or operator. These parameters can be present in both the INIT_RESP or AVAIL_SPECTRUM_RESP messages, when the messages are configured in accordance with a standard, such as PAWS. The parameters can be convoluted with time availability information as well as shown in Table 2.

TABLE 2

| INIT_RESP/AVAIL_SPECTRUM_RESP | |
|---|---|
| rulesetInfo:RulesetInfo | required |
| new_db_address; starttime | optional |
| additional_db_addresses | Optional |
| *other:any | depends |

In the example of Table 2, the parameter "new db_address; starttime" may take the format of an address, such as a URI or URL of a TV WSDB, appended by a timestamp.

The master may also request that the TV WSDB send a complete list of approved databases for the jurisdiction by inserting a parameter in the INIT_REQ or AVAIL_SPECTRUM_REQ message, as depicted at Table 3.

TABLE 3

| INIT_REQ | |
|---|---|
| deviceDesc:DeviceDescriptor | required |
| location:GeoLocation | required |
| deviceOwner:DeviceOwner | required |
| additional_db_address_list | optional |
| *other:any | depends |

When the Table 3 additional_db_address_list parameter is present in the Initialization Request (INIT_REQ) or available spectrum request (AVAIL_SPECTRUM_REQ), the master should include the additional_db_addresses parameter into the response to that message. The master may also specify a different regulatory domain from where it wants the database addresses, as depicted at Table 4.

TABLE 4

| INIT_REQ | |
|---|---|
| deviceDesc:DeviceDescriptor | required |
| location:GeoLocation | required |
| deviceOwner:DeviceOwner | required |
| additional_db_address_list; reg_domain | optional |
| *other:any | depends |

The reg_domain parameter of Table 4 may take a value of a regulator, such as the FCC, OFCOM, and the like. When the regulatory domain is specified, the TV WSDB may return only database addresses it knows from the specified regulatory domain. If it knows none, then the parameter in the response may not contain any addresses. When a master knows about a new (for example, another) database somehow (either by manual configuration or a database update from the currently used TV WSDB), the master may not know what authentication/authorization model the TV WSDB uses. The master may contact the new TV WSDB, and ask the TV WS DB (also referred to herein as db or database) about this information, as depicted at Table 5.

TABLE 5

| INIT_REQ | |
|---|---|
| deviceDesc:DeviceDescriptor | required |
| location:GeoLocation | required |
| deviceOwner:DeviceOwner | required |
| auth_model_type | optional |
| *other:any | depends |

The INIT_REQ message (see, for example, http://www.i-etf.org/id/draft-ietf-paws-protocol-03.txt) may be extended to include, a parameter auth_model_type, which allows the master to query for authentication/authorization information used by the TV WSDB. As a response, for example, the database may respond with including the requested parameters in the INIT_RESP message in accordance with Table 6 below.

TABLE 6

| INIT_RESP | |
|---|---|
| rulesetInfo:RulesetInfo | required |
| auth_model | optional |
| credential type | optional |
| *other:any | depends |

The auth_model parameter may take the value of registration required or not required. The credential type may take values of a client certificate issued by a company or a username/password.

A message configured in accordance with PAWS, such as the GETDATABASEADDR message, may be implemented, which may take format depicted at Table 7.

TABLE 7

| GET_DB_ADDR | |
|---|---|
| deviceDesc:DeviceDescriptor | required |
| location:GeoLocation | required |
| deviceOwner:DeviceOwner | required |
| db_address_list | required |
| *other:any | depends |

When receiving a message in accordance with Table 7, a TV WSDB or server may generate a database address list message, with a format as depicted at Table 8.

TABLE 8

| DB_ADDR_LIST | |
|---|---|
| DB1_ADDR | required |
| DB2_ADDR | optional |
| DBn_ADDR | optional |

The database addresses at Table 8 are the addresses of the approved TV WSDBs in the regulatory domain of the accessed TV WSDB. All the parameters applicable for the AVAIL_SPECTRUM_RESP message may also be applicable for the AVAIL_ SPECTRUM _BATCH RESP messages as well. Similarly, if a parameter is applicable for AVAIL_SPECTRUM_REQ, it may also be applicable for AVAIL_SPECTRUM_BATCH_REQ.

Figure 5:
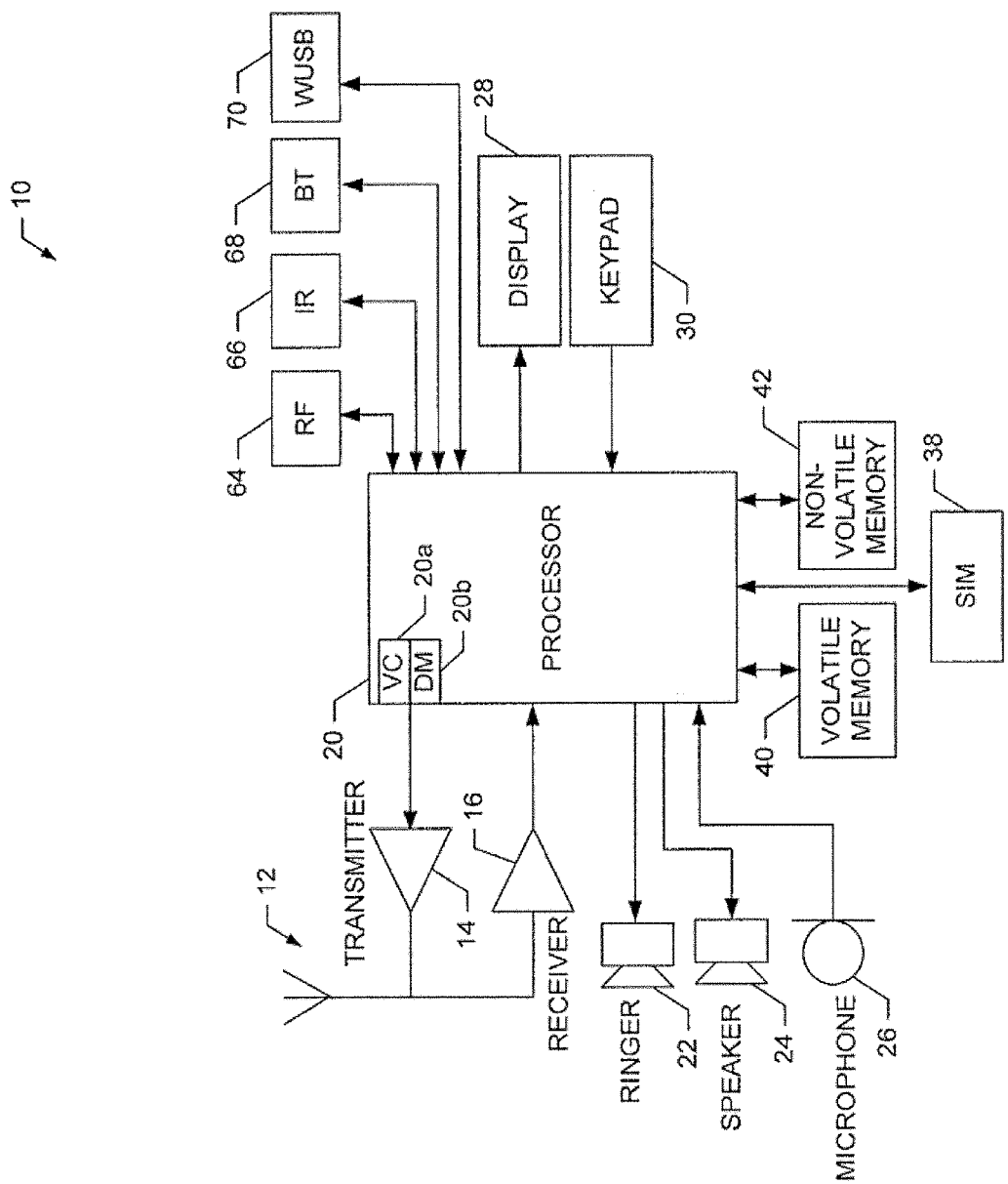
FIG. 5 depicts an example of user equipment, in accordance with some example embodiments.

FIG. 5 illustrates a block diagram of an apparatus 10, which can be configured as user equipment in accordance with some example embodiments.

The apparatus 10 may include at least one antenna 12 in communication with a transmitter 14 and a receiver 16. Alternatively transmit and receive antennas may be separate. In some example embodiments, the apparatus 10 may be implemented as a multi-mode radio including a plurality of radio access technologies (for example, including a cellular radio transceiver, WiFi transceiver, a cognitive radio for TV white space, and/or the like). When this is the case, apparatus 10 may include a plurality of radio frequency subsystems configured in accordance with a plurality of radio access technologies. For example, apparatus 10 may include antenna(s) (for example, antenna 12 described below), radio frequency components (for example, transmitter 14 and receiver 16 described below), and other devices configured to provide access to a cellular radio access network, such as Long Term Evolution and the like, and may further include another set of antenna(s), radio frequency components, and other devices configured to provide access to TV white space, and so forth.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example, a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 5 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as for example, Institute of Electrical and Electronics Engineers (IEEE) 802.11, 802.16, and/or the like, or their combinations. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols such as GERAN, GPRS or alike, third-generation (3G) communication protocols such as WCDMA, HSPA, cdma2000, TD-SCDMA or alike, fourth-generation (4G) communication protocols such as LTE, EUTRA, TD-LTE or alike, or evolved packet systems such as Internet Protocol Multimedia Subsystem (IMS) communication protocols (for example, session initiation protocol (SIP) and/or the like. The apparatus may also implement Internet protocols or their additions for IP flow mobility, or higher layer protocols as http, Skype, Youtube, Netflix, or alike. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as for example, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as for example, Long Term Evolution (LTE), Evolved Universal Terrestrial Radio Access Network (E-UTRAN), and/or white space frequencies, and/or the like. Additionally, for example, the apparatus 10 may be capable of operating in accordance with 4G wireless communication protocols, such as for example, LTE Advanced and/or the like as well as similar wireless communication protocols that may be subsequently developed. In addition, for example, the apparatus 10 may be capable of operating in accordance with white space frequencies, such as TV white space, using for example, a cognitive radio and/or any other type of radio transceiver.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as for example, a web browser. The connectivity program may allow the apparatus 10 to transmit and receive web content, such as for example, location-based content, according to a protocol, such as for example, wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as for example, a keypad 30 (which can be a virtual keyboard presented on display 28 or an externally coupled keyboard) and/or other input devices.

As shown in FIG. 5, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as for example, an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, radio standards. In this regard, the apparatus 10 and, in particular, the short-range transceiver may be capable of transmitting data to and/or receiving data from electronic devices within a proximity of the apparatus, such as for example, within 10 meters, for example. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as for example, IEEE 802.11 techniques, IEEE 802.15 techniques, IEEE 802.16 techniques, and/or the like.

The apparatus 10 may comprise memory, such as for example, a subscriber identity module (SIM) 38, a removable user identity module (R-UIM), a soft-SIM software module and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as for example, an international mobile equipment identification (IMEI) code, capable of uniquely identifying apparatus 10. The functions may include one or more of the operations disclosed herein with respect to the user equipment, such as for example, the functions disclosed at FIGS. 2-4 (for example, send requests for updates to TV WSDBs, receive responses, and/or the like). The memories may comprise an identifier, such as for example, an international mobile equipment identification (IMEI) code, capable of uniquely identifying apparatus 10. In the example embodiment, the processor 20 may be configured using computer code stored at memory 40 and/or 42 to enable the user equipment to send requests for updates to a list of TV WSDBs configured at the user equipment and the like, serve as a white space slave, server as a white space master, and the like.

Figure 6:
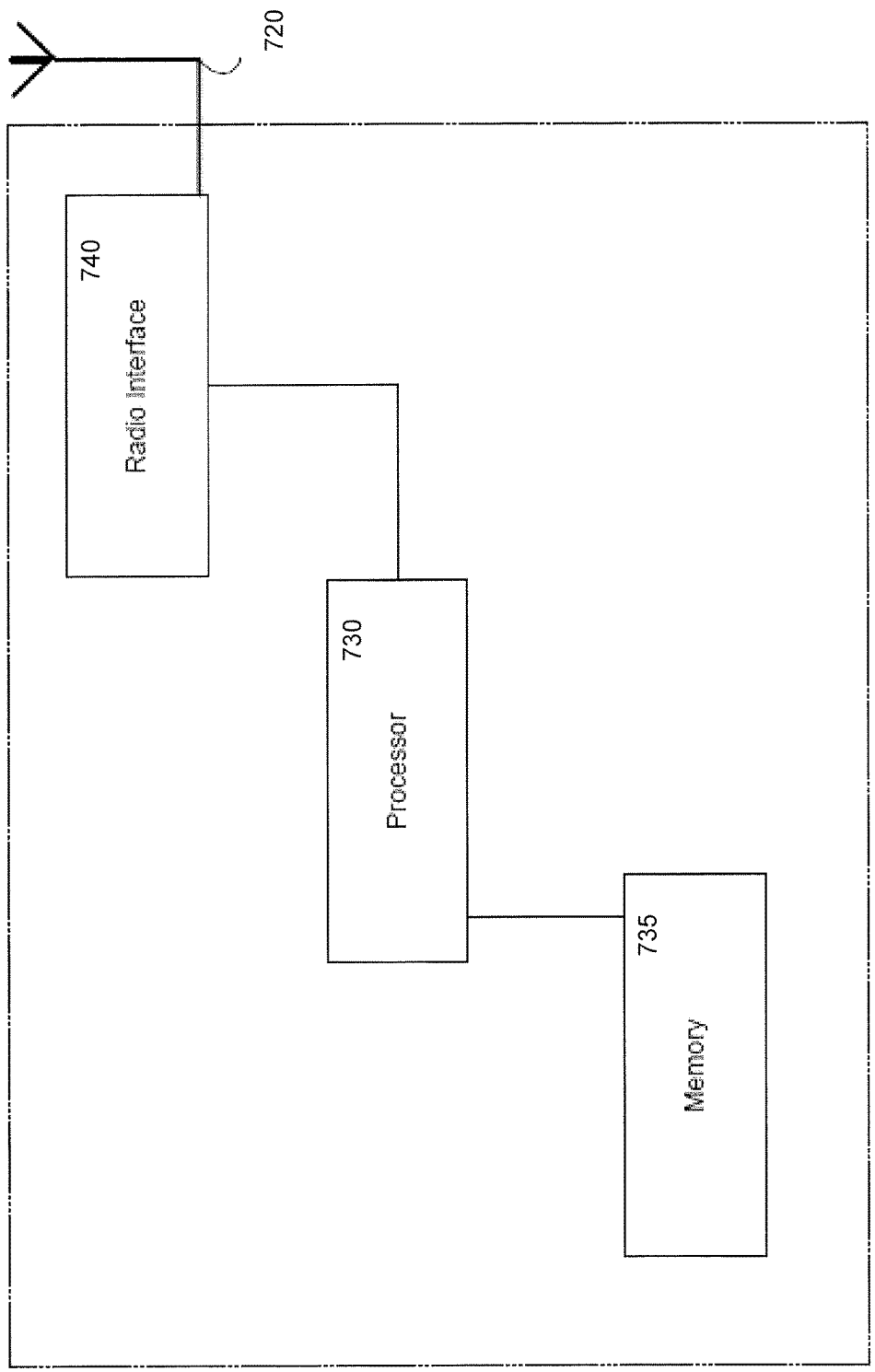
FIG. 6 depicts an example of a base station, in accordance with some example embodiments.

FIG. 6 depicts an example implementation of a network node, such as a cellular base station and/or a WLAN AP, or a combination thereof. The network node may include one or more antennas 720 configured to transmit via a downlink and configured to receive uplinks via the antenna(s) 720. The network node may further include a plurality of radio interfaces 740 coupled to the antenna 720. The radio interfaces may correspond one or more of the following: Long Term Evolution (LTE, or E-UTRAN), Third Generation (3G, UTRAN, or high speed packet access (HSPA)), Global System for Mobile communications (GSM), wireless local area network (WLAN) technology, such as for example 802.11 WiFi and/or the like, Bluetooth, Bluetooth low energy (BT-LE), near field communications (NFC), and any other radio technologies. The radio interface 740 may further include other components, such as filters, converters (for example, digital-to-analog converters and/or the like), mappers, a Fast Fourier Transform (FFT) module, and/or the like, to generate symbols for a transmission via one or more downlinks and to receive symbols (for example, via an uplink). The network node may further include one or more processors, such as processor 730, for controlling the network node and for accessing and executing program code stored in memory 735. In some example embodiments, memory 735 includes code, which when executed by at least one processor causes one or more of the operations described herein with respect to a base station and/or a wireless access point. For example, the network node may serve as a white space master, obtain white space frequency information including updates on behalf of a user equipment, and the like.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as for example, a computer or data processor, with examples depicted at FIGS. 5 and 6. A computer-readable medium may comprise a non-transitory computer-readable storage medium that may be any media that can contain or store the instructions for use by or in connection with an instruction execution system, apparatus, or device, such as for example, a computer. Moreover, some of the embodiments disclosed herein include computer programs configured to cause methods as disclosed herein (see, for example, FIGS. 1-4 and/or the like).

Without in any way limiting the scope, interpretation, or application of the claims appearing below, a technical effect of one or more of the example embodiments disclosed herein may enhance the discovery of white space databases.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least."

What is claimed:

1. A method comprising:
   sending, by a user equipment, a request to a server including a white space database, wherein the server is located at a first address, and wherein the request comprises an INIT REQ message, an AVAIL SPECTRUM REQ message, an AVAIL SPECTRUM BATCH REQ message, and/or a registration message; and
   receiving, at the user equipment and from the server, a response to the request, the response including a white space database update indicating a second address for accessing the server, wherein the second address is representative of an address change and/or an address update of the first address, and wherein the response comprises an INIT RESP message, an AVAIL SPECTRUM RESP message, an AVAIL SPECTRUM BATCH RESP message, and/or a registration response message.

2. The method of claim 1, wherein the response further includes a start time representative of when the server is not accessible to obtain an allocation of a white space frequency due to one of a permanent shutdown of the server or a temporary shutdown of the server.

3. The method of claim 1, wherein the request includes a white space related information parameter.

4. The method of claim 1, wherein the response further includes an indication of whether the first address is to be replaced with the second address.

5. The method of claim 1, wherein the first address is a database uniform resource identifier.

6. The method of claim 1, wherein the response includes a plurality of addresses for a plurality of white space databases.

7. The method of claim 1, wherein the response further includes registration information associated with the second address in the response and/or authorization information associated with the second address in the response.

8. The method of claim 1, wherein the server comprises a provisioning server and/or a regulatory server, wherein the provisioning server is maintained by a manufacturer of the user equipment to provide the response including addresses of white space databases available and authorized to allocate white space frequencies to the user equipment, and wherein the regulatory server is maintained by a regulator of white space frequencies in a regulatory domain covered by the user equipment.

9. An apparatus comprising:
   at least one processor; and
   at least one memory including computer program code, the at least one memory and the computer program code configured to, with the at least one processor, cause the apparatus to:
   send a request to a server including a white space database, wherein the server is located at a first address, and wherein the request comprises an INIT REQ message, an AVAIL SPECTRUM REQ message, an AVAIL SPECTRUM BATCH REQ message, and/or a registration message; and
   receive, from the server, a response to the request, the response including a white space database update indicating a second address for accessing the server, wherein the second address is representative of an address change and/or an address update of the first address, and wherein the response comprises an INIT RESP message, an AVAIL SPECTRUM RESP message, an AVAIL SPECTRUM BATCH RESP message, and/or a registration response message.

10. The apparatus of claim 9, wherein the response further includes a start time representative of when the server is not accessible to obtain an allocation of a white space frequency due to one of a permanent shutdown of the server or a temporary shutdown of the server.

11. The apparatus of claim 9, wherein the request includes a white space related information parameter.

12. The apparatus of claim 9, wherein the response further includes an indication of whether the first address is to be replaced with the second address.

13. The apparatus of claim 9, wherein the first address is a database uniform resource identifier.

14. The apparatus of claim 9, wherein the response includes a plurality of addresses for a plurality of white space databases.

15. The apparatus of claim 9, wherein the response further includes registration information associated with the second address in the response and/or authorization information associated with the second address in the response.

16. The apparatus of claim 9, wherein the server comprises a provisioning server and/or a regulatory server, wherein the provisioning server is maintained by a manufacturer of the apparatus to provide the response including addresses of white space databases available and authorized to allocate white space frequencies to the apparatus, and wherein the regulatory server is maintained by a regulator of white space frequencies in a regulatory domain covered by the apparatus.

* * * * *